United States Patent
Aoyagi et al.

(10) Patent No.: US 9,796,821 B2
(45) Date of Patent: *Oct. 24, 2017

(54) COMPOSITE MATERIAL

(71) Applicant: Hitachi, Ltd., Tokyo (JP)

(72) Inventors: Takuya Aoyagi, Tokyo (JP); Takashi Naito, Tokyo (JP); Tadashi Fujieda, Tokyo (JP); Yuichi Sawai, Tokyo (JP); Hajime Murakami, Tokyo (JP); Hiroshi Yoshida, Tokyo (JP); Akihiro Miyauchi, Tokyo (JP); Masahiko Ogino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/368,978

(22) PCT Filed: Nov. 19, 2012

(86) PCT No.: PCT/JP2012/079888
§ 371 (c)(1),
(2) Date: Jun. 26, 2014

(87) PCT Pub. No.: WO2013/099469
PCT Pub. Date: Jul. 4, 2013

(65) Prior Publication Data
US 2014/0378581 A1    Dec. 25, 2014

(30) Foreign Application Priority Data
Dec. 26, 2011    (JP) .................................. 2011-282624

(51) Int. Cl.
C08J 3/28    (2006.01)
C08J 5/12    (2006.01)
(Continued)

(52) U.S. Cl.
CPC    *C08J 5/12* (2013.01); *C03C 3/21* (2013.01); *C03C 12/00* (2013.01); *C03C 14/00* (2013.01);
(Continued)

(58) Field of Classification Search
CPC .......................................................... C08J 3/28
See application file for complete search history.

(56) References Cited

U.S. PATENT DOCUMENTS 3,732,181 A * 5/1973 Ray et al. ............... B32B 27/00
523/207
6,861,455 B2    3/2005 Hayashi
(Continued)

FOREIGN PATENT DOCUMENTS

CN    1774405 A    5/2006
JP    2004-250276 A    9/2004
(Continued)

OTHER PUBLICATIONS

Japanese Office Action, Japanese Patent Appln. No. 2011-282624, Jul. 16, 2014, 3 pp.
(Continued)

Primary Examiner — Randy Gulakowski
Assistant Examiner — Ha S Nguyen
(74) Attorney, Agent, or Firm — Volpe and Koenig, P.C.

(57) ABSTRACT

Mechanical strength of a composite material is enhanced by a simple process. In a composite material comprising a resin or a rubber and an oxide glass, the resin or the rubber is dispersed in the oxide glass, or the oxide glass is dispersed in the resin or the rubber. The composite material has a function that the oxide glass is softened and fluidized by electromagnetic waves.

13 Claims, 4 Drawing Sheets

(51) Int. Cl.

| | |
|---|---|
| *C03C 3/21* | (2006.01) |
| *C03C 3/12* | (2006.01) |
| *C03C 8/08* | (2006.01) |
| *C03C 14/00* | (2006.01) |
| *C03C 12/00* | (2006.01) |
| *C09D 7/12* | (2006.01) |
| *C09D 125/06* | (2006.01) |
| *C09D 163/00* | (2006.01) |
| *C08K 7/14* | (2006.01) |
| *C08K 3/40* | (2006.01) |

(52) U.S. Cl.
CPC ...... *C08J 3/28* (2013.01); *C08K 7/14* (2013.01); *C09D 7/1216* (2013.01); *C09D 125/06* (2013.01); *C09D 163/00* (2013.01); *C03C 2214/12* (2013.01); *C03C 2214/30* (2013.01); *C08J 2325/06* (2013.01); *C08J 2363/00* (2013.01)

(56) References Cited

U.S. PATENT DOCUMENTS

| | | | |
|---|---|---|---|
| 7,255,549 B2 * | 8/2007 | Hadley | B29C 35/0266 264/328.12 |
| 7,425,518 B2 | 9/2008 | Yoshida et al. | |
| 7,629,279 B2 | 12/2009 | Tanaka et al. | |
| 7,863,207 B2 | 1/2011 | Son et al. | |
| 2002/0035852 A1 * | 3/2002 | Wang | C03B 27/00 65/34 |
| 2006/0025513 A1 * | 2/2006 | Nakagawa | C03C 3/19 524/494 |
| 2009/0044496 A1 * | 2/2009 | Botelho | B32B 17/06 53/477 |
| 2009/0064717 A1 * | 3/2009 | Son et al. | 65/42 |
| 2010/0180934 A1 * | 7/2010 | Naito et al. | 136/252 |
| 2011/0306257 A1 * | 12/2011 | Arpin | 442/131 |

FOREIGN PATENT DOCUMENTS

| | | |
|---|---|---|
| JP | 2005-008488 A | 1/2005 |
| JP | 2009-067672 A | 4/2009 |
| JP | 2010-184852 A | 8/2010 |
| JP | 2012-106891 A | 6/2012 |
| JP | 2013-032255 A | 2/2013 |
| JP | 2013-132756 A | 7/2013 |
| JP | 2013-132757 A | 7/2013 |
| JP | 2013-133342 A | 7/2013 |
| WO | 2004076371 A2 | 9/2004 |

OTHER PUBLICATIONS

Wang Dongliang, Etc., Inorganic Non-Metallic Materials Handbook, p. 714-715, Chemical Industry Publishing House, 1st Edition, Jul. 31, 2009.

Wu Xiulan, Etc., Inorganic Non-Metallic Materials Handbook, p. 147, Chemical Industry Publishing House, 1st Edition, Aug. 31, 2004.

Office Action received for Chinese Patent Application No. 201280061158.9 dated Jul. 26, 2016.

\* cited by examiner

COMPOSITE MATERIAL

TECHNICAL FIELD

The present invention relates to a composite material in which a glass and a resin or a rubber are mixed.

BACKGROUND ART

Resins and rubbers (hereinafter referred to as resin, etc.) are light in weight and can be molded easily at a relatively low temperature compared with other materials but, on the other hand, they involve such drawbacks that they are deteriorated remarkably by UV-light and are poor in mechanical strength and gas barrier property. On the other hand, while glass is excellent in chemical stability and has high mechanical strength or gas barrier property compared with the resin and the rubber but it has, a drawback of tending to cause brittle fracture and being heavy in weight.

Accordingly, composite materials comprising resins and glasses to compensate their respective drawbacks have been invented as typically represented by glass fiber reinforced plastics (GFRP). However, since adhesion between an oxide such as the glass and the resin is low, the strength at the boundary between them predominates the mechanical strength of the composite material.

For example, a patent literature 1 discloses that a sizing agent containing a silane coupling agent and a resin is coated on the surface of glass fibers.

CITATION LIST

Patent Literature

Patent Literature 1: Japanese Unexamined Patent Application Publication No. 2005-8488

SUMMARY OF INVENTION

Technical Problem

However, the glass fiber reinforced plastic of the patent literature 1 involves a subject that a complicate surface treatment has to be applied to the glass when the resin and the glass are composited.

The present invention is to enhance the mechanical strength of the composite material by a simple process.

Solution to Problem

For attaining the object described above, the present invention provides a composite material comprising a resin or rubber and an oxide glass characterized in that the resin or rubber is dispersed in the oxide glass, or the oxide glass is dispersed in the resin or the rubber and the oxide glass has a function of being softened and fluidized by electromagnetic waves.

Advantageous Effects of Invention

According to the present invention, a mechanical strength of a composite material can be improved by a simple process.

DESCRIPTION OF EMBODIMENTS

The present invention is to be described with reference to the drawings.

(Composite Material of Resin, Etc. and Oxide Glass)

Figure 1:
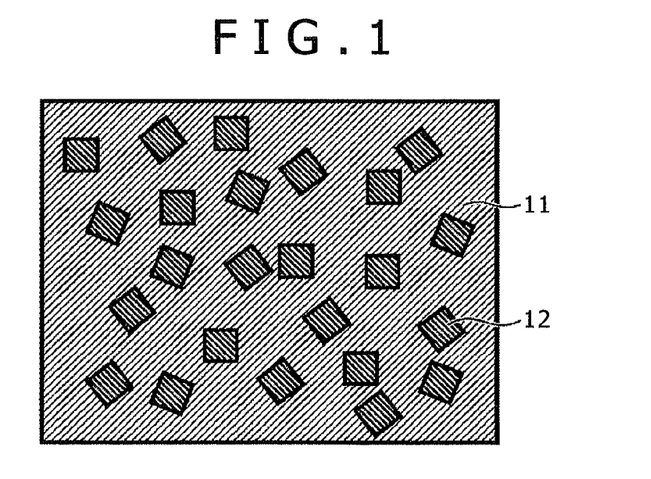
FIG. 1 is a schematic cross sectional view of a composite resin material.
Figure 2:
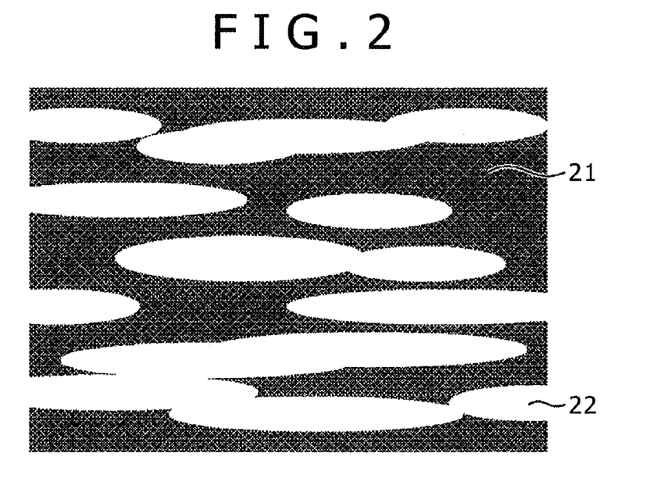
FIG. 2 is a schematic cross sectional view of a composite resin material.

FIG. 1 and FIG. 2 are schematic cross sectional views of a composite material. As illustrated in FIG. 1, a glass oxide 12 is dispersed in a matrix of resin, etc. The resin, etc. 11 and the oxide glass 12 form bonds by irradiation of electromagnetic waves thereby strengthening the bond strength at the boundary. The bonds are formed because the oxide glass is heated by irradiation of electromagnetic waves and softened and fluidized. Accordingly, in the present invention, it is suffice that electromagnetic waves are applied to a formed composite material and there is no particular restriction for the method of manufacturing the composite material in FIG. 1. Accordingly, the composite material can be manufactured by using known methods such as injection molding. Further, since the oxide glass in the manufactured composite material is heated and softened by the irradiation of electromagnetic waves, it has a function of being softened and fluidized again and again in the resin, etc. Since the bonds are formed by the irradiation of the electromagnetic waves, adhesion between the glass and the resin, etc. is enhanced without requiring a pretreatment, for example, by a silane coupling agent to provide a composite material excellent in the mechanical strength.

Further, in FIG. 2, resin, etc. are dispersed in the matrix of an oxide glass 21. In the same manner as in FIG. 1, bonds of them are strengthened more by the irradiation of electromagnetic waves. For manufacturing the structure as illustrated in FIG. 2, it is important that a softening and fluidizing temperature of the oxide glass 21 is as close as a temperature at which the resin, etc. 22 are softened and fluidized.

As the electromagnetic waves for forming the bonds between the resin, etc. and the oxide glass, visible light to infrared light at a wavelength of 400 to 3000 nm can be used. Further, when the visible light and the infrared light are utilized, a laser light at a high light intensity is preferred. A laser oscillation source is not particularly restricted and known semiconductor lasers and solid lasers can be used. The wavelength region is restricted because the resin, etc. are deteriorated at less than 400 nm since the light intensity is too strong and the resin, etc. are heated due to absorption to the resin, etc. at 3000 nm or longer. However, even within the wavelength region described above, since there exists a wavelength to be adsorbed depending on the resin, etc., the wavelength has to be selected properly depending on the material used. As the criterion for selecting the wavelength, it is important that absorption of the oxide glass is stronger than that of the resin in the composite material. A wavelength transmittance of the oxide glass used is preferably smaller by 20% or more than that of the resin, etc.

Further, microwaves at 0.1 to 1,000 mm can also be used in view of the wavelength of electromagnetic waves different from that described above. The glass of the invention has a semiconductor property and effectively absorbs microwaves at the wavelength described above. Accordingly, the glass can be heated in the same manner as by the laser. Also the oscillation source of the microwaves is not restricted particularly and a wavelength in a 45 GHz band used, for example, in known home electronic ovens can also be used.

Since the oxide glass used in the invention has a semiconductor property, the manufactured composite material also has an electric conductivity to some extent. Accordingly, packages for various kinds of electronic devices having an antistatic function can be provided. Further, by compositing the composite material of the invention and glass fibers, the glass fibers and the glass in the matrix resin can be adhered closely, to provide a material in which a bond strength at the boundary between the glass fiber and the matrix resin is improved greatly compared with a usual resin matrix. Further, when a blade for wind power generation having a feature comprising the glass fiber reinforced resin is manufactured, the wind power generation blade can be provided with electric conductivity to reduce damages due to current passage caused by thunderbolt struck, etc.

(Oxide Glass)

The oxide glass in the invention can be heated to be softened and fluidized by absorption of the electromagnetic waves as described above. Accordingly, an element having a band structure that absorbs the electromagnetic waves of a wavelength used has to be incorporated in the oxide glass as the constituent ingredient of the oxide glass. As the element, transition metal elements which are elements having electrons in the d-orbital are preferred. Among them, vanadium (V) is particularly preferred. Vanadium is particularly preferred because vanadium has an effect of not only showing adsorption in the wavelength region described above but also lowering the characteristic temperature of the oxide glass.

Further, the oxide glass preferably satisfies the following relation of: $V_2O_5 > TeO_2 \geq P_2O_5$ (mass %) or relation of: $Ag_2O \geq TeO_2 \geq P_2O_5$ (mass %) in the state of oxides and, further the total of the oxides in this state is 70 mass % or more and 95 mass % or less. This is desired since the moisture resistance of the oxide glass is improved and the characteristic temperature of the oxide glass is lowered (transition point: 330° C. or less) when the relation: $V_2O_5 > TeO_2 \geq P_2O_5$ (mass %) is satisfied. $TeO_2$ contributes greatly to the lowering of the characteristic temperature and to the improvement in the moisture resistance of the oxide glass. If $TeO_2 < P_2O_5$, it is not preferred since not only the moisture resistance of the oxide glass is no more satisfactory but also the characteristic temperature is less lowered. Further, it is preferred that the relation of: $Ag_2O > TeO_2 \geq P_2O_5$ (mass %) is satisfied, since not only the moisture resistance is satisfactory but also the characteristic temperature is remarkably lowered (transition point: 240° C. or lower) than that of the oxide glass satisfying the relation of: $V_2O_5 > TeO_2 \geq P_2O_5$ (mass %). This is because the characteristic temperature of the oxide glass is lowered when $Ag_2O$ is contained in a great amount as the constituent ingredient. However, in an oxide glass satisfying the relation of: $Ag_2O > TeO_2 \geq P_2O_5$ (mass %), it is essential that V is contained in the composition with a view point of laser absorption property and, more preferably, $V_2O_5$ is contained by 10 mass % or more with a view point of improving the laser absorption property.

Additives to the oxide glass are preferably selected from the group, of elements consisting of iron (Fe), barium (Ba), potassium (K), tungsten (W), molybdenum (Mo), manganese (Mn), antimony (Sb), and bismuth (Bi). Fe, Sb, and Bi have an effect of not only increasing the laser absorption but also improving the moisture resistance of the oxide glass when they are contained in the oxide glass. While Fe less changes the valance number of V and Fe ions serve as a laser absorption source, Sb and Bi have an effect of reducing V from pentavalent to tetravalent states and extending the laser absorption wavelength region of V. Ba and K are modification elements of the oxide glass and have an effect of improving the moisture resistance. W has an effect of improving the thermal stability of the oxide glass and can be used, particularly, for suppressing crystallization of glass during heating. Mo and Mn have an effect of improving the laser absorption property. Such additives can be properly selected and added conforming to required properties.

For the compositional ranges of the oxide glass, a more preferred composition comprises, in terms of oxide conversion, 35 to 55 mass % of $V_2O_5$, 15 to 35 mass % of $TeO_2$, 4 to 20 mass % of $P_2O_5$, 5 to 15 mass % of $Fe_2O_3 + Sb_2O_3$ in total, and 5 to 30 mass % of one or more of $Fe_2O_3$, $BaO$, $K_2O$, $WO_3$, $MoO_3$, $MnO_2$, $Sb_2O_3$, and $Bi_2O_3$. In the present invention, when it is described, for example, as 35 to 55 mass %, this means 35 mass % or more and 55 mass % or less. An oxide glass particularly excellent in the moisture resistance and the laser absorption property of the oxide glass can be provided within the compositional range. Further, the electric resistivity of the oxide glass contained in the compositional range shows an n-type semiconductor property at about $10^{15}$ to $10^8$ $\Omega \cdot cm$ due to hopping electroconduction of tetravalent V and pentavalent V contained in the oxide glass. Accordingly, the oxide glass has an ability that can be heated sufficiently by microwaves at a wavelength of 0.1 to 1000 mm.

Referring to the reason of defining the compositional range, if $V_2O_5$ is less than 35 mass %, not only the characteristic temperature is higher but also the laser absorption property is no more satisfactory. On the other hand, the content of more than 55 mass % is not preferred since the moisture resistance of the glass is no more satisfactory. $TeO_2$ content of less than 15 mass % is not preferred since the moisture resistance is not satisfactory. If the content is more than 35 mass, the laser absorption property is worsened since the proportion of $TeO_2$ in the entire oxide glass composition is excessively large. Further, this is not preferred since the electric resistivity which is important upon absorption of the microwave is increased. $P_2O_5$ content of less than 4 mass % is not preferred since the electric resistivity increases and the content of more than 20 mass % is not preferred since the moisture resistance of the oxide glass is remarkably worsened. When the total content of the $Fe_2O_3 + Sb_2O_3$ is less than 5 mass %, the effect of improving the moisture resistance is not so large and the total content of more than 15 mass is not preferred since the thermal stability of the oxide glass is lowered. Further, the characteristic temperature of the oxide glass is also increased. Further, when one or more of $Fe_2O_3$, $BaO$, $K_2O$, $WO_3$, $MoO_3$, $MnO_2$, $Sb_2O_3$ and $Bi_2O_3$ contained as additives is less than 5 mass %, this is not preferred since the effect as the additive is not improved so much. The content of more than 30 mass % is not preferred since this gives an undesired effect on the thermal stability, the moisture resistance, and the characteristic temperature of the oxide glass.

The method of manufacturing the oxide glass of the invention is not particularly restricted and the oxide glass can be manufactured by charging a starting material formed by blending and mixing each of oxides as the starting materials in a platinum crucible, heating them to 900 to 950° C. at a temperature elevation rate of 5 to 10° C./min in an electric furnace and then keeping them for several hours. During keeping, they are preferably stirred for obtaining a homogeneous glass. When the crucible is taken out of the electric furnace, it is preferably cast in a graphite casting mold or on a stainless steel plate previously heated to about 150° C. for preventing moisture absorption to the surface of the oxide glass.

(Resin, Etc.)

The resin, etc. of the invention are not restricted particularly, may be either crystalline or amorphous, and may also be used not only alone but also in combination of plural kinds of them. Resins usable herein include, for example, polyethylene, polyvinyl chloride, polypropylene, polystyrene, polyvinyl acetate, ABS resin, AS resin, acryl resin, polyacetal resin, polyimide, polycarbonate, modified polyphenylene ether (PPE), polybutylene terephthalate (PBT), polyarylate, polysulfone, polyphenylene sulfide, polyether ether ketone, polyimide resin, fluoro resin, polyamideimide, polyether ether ketone, epoxy resin, phenolic resin, polyester, and polyvinyl ester. As the rubber, resins such as fluoro rubber, silicone rubber, and acryl rubber can be used.

However, since the oxide glass is melted by the electromagnetic waves while being in contact with the resins, etc., it is preferred that the heat resistant temperature of the resin, etc. is as high as possible. Preferably, the heat decomposition temperature of the resin, etc., if at a transition point of the oxide glass+100° C., or higher. The heat decomposition temperature of the resin, etc. is lower than the transition point of the oxide glass+100° C. is not preferred since the resin, etc. may sometimes be burnt by the oxide glass heated by the electromagnetic waves.

Further, when a composite material of thermoplastic resin+oxide glass is manufactured in the present invention, a function of repairing the composite material can be provided by irradiation of electromagnetic waves. For example, when fractured or depleted portions are caused in the composite material, the composite material can be repaired by the irradiation of laser to the portions thereby selectively heating to soften and fluidize the oxide glass and newly providing bonds to the fractured and depleted portions.

Description is to be made further in details using examples. However, the present invention is not restricted by the description of the embodiment mentioned herein and they may be properly combined.

Example 1

Preparation of Oxide Glass

Table 1 shows prepared and investigated glass compositions.

Table 1 and Table 2 show compositions and properties of low melting glass compositions put to preparation and investigation. Each of ingredients is represented by weight ratio in terms of oxide conversion shown in Table 1. In the low melting glass compositions, lead was not substantially incorporated in view of environmental safety. The glass materials used were $V_2O_5$ for vanadium, $P_2O_5$ for phosphorus, $TeO_2$ for tellurium, $Ag_2O$ for silver, $Fe_2O_3$ for iron, $MnO_2$ for manganese, $ZnO$ for zinc, $WO_3$ for tungsten, $MoO_3$ for molybdenum, $Ba(PO_3)_2$ or $BaCO_3$ for barium, $K_2CO_3$ for potassium, $Sb_2O_3$ for antimony, and $Bi_2O_3$ for bismuth. When $Ba(PO_3)_2$ was used as the starting material, the amount of $P_2O_5$ material was decreased and converted.

TABLE 1

| Glass No. | Glass composition Composition (mass %) | | | | | | | | | | | | |
|---|---|---|---|---|---|---|---|---|---|---|---|---|---|
| | $V_2O_5$ | $P_2O_5$ | $TeO_2$ | $Ag_2O$ | $Fe_2O_3$ | $MnO_2$ | $ZnO$ | $WO_3$ | $MoO_3$ | $BaO$ | $K_2O$ | $Sb_2O_3$ | $Bi_2O_3$ |
| G1 | 65 | 20 | 15 | | | | | | | | | | |
| G2 | 65 | 20 | 10 | | 5 | | | | | | | | |
| G3 | 65 | 20 | | | | 10 | | | | 5 | | | |
| G4 | 65 | 20 | 5 | | 5 | 5 | | | | | | | |
| G5 | 65 | 20 | 5 | | | 10 | | | | | | | |
| G6 | 65 | 20 | 5 | | | 7 | 3 | | | | | | |
| G7 | 65 | 20 | 5 | | | 5 | | 5 | | | | | |
| G8 | 60 | 20 | | | | 10 | 10 | | | | | | |
| G9 | 60 | 20 | | | 5 | 10 | | | | 5 | | | |
| G10 | 60 | 20 | 5 | | | 15 | | | | | | | |
| G11 | 60 | 20 | 10 | | | 10 | | | | | | | |
| G12 | 60 | 15 | 20 | | 5 | | | | | | | | |
| G13 | 60 | 15 | 25 | | | | | | | | | | |
| G14 | 55 | 10 | 25 | | 10 | | | | | | | | |
| G15 | 55 | 15 | 20 | | 10 | | | | | | | | |
| G16 | 55 | 20 | 5 | | | 15 | | | | | | | |
| G17 | 55 | 15 | 20 | | 5 | | | | | 5 | | | |
| G18 | 55 | 20 | 15 | | | 5 | | | | 5 | | | |
| G19 | 55 | 20 | 15 | | | 10 | | | | | | | |
| G20 | 55 | 10 | 20 | | 10 | 5 | | | | | | | |
| G21 | 55 | 10 | 20 | | 10 | | 5 | | | | | | |
| G22 | 55 | 15 | 20 | | 5 | | | 5 | | | | | |
| G23 | 55 | 15 | 20 | | 5 | | | | 5 | | | | |
| G24 | 55 | 15 | 20 | | 5 | | | | | 5 | | | |
| G25 | 55 | 15 | 20 | | 5 | 5 | | | | | | | |
| G26 | 52 | 22 | | | 8 | 3 | | | | 15 | | | |
| G27 | 50 | 15 | 20 | 15 | | | | | | | | | |
| G28 | 50 | 15 | 25 | 10 | | | | | | | | | |

TABLE 1-continued

Glass composition

| Glass No. | V$_2$O$_5$ | P$_2$O$_5$ | TeO$_2$ | Ag$_2$O | Fe$_2$O$_3$ | MnO$_2$ | ZnO | WO$_3$ | MoO$_3$ | BaO | K$_2$O | Sb$_2$O$_3$ | Bi$_2$O$_3$ |
|---|---|---|---|---|---|---|---|---|---|---|---|---|---|
| G29 | 50 | 20 | 20 |  | 10 |  |  |  |  |  |  |  |  |
| G30 | 50 | 20 | 20 |  | 5 |  | 5 |  |  |  |  |  |  |
| G31 | 50 | 20 | 5 |  |  | 25 |  |  |  |  |  |  |  |
| G32 | 50 | 20 | 10 |  | 10 |  | 5 |  |  | 5 |  |  |  |
| G33 | 50 | 15 | 20 |  | 5 |  |  | 5 |  | 5 |  |  |  |
| G34 | 48 | 22 |  |  | 10 |  | 3 |  |  | 15 |  |  |  |
| G35 | 45 | 20 | 20 |  | 10 |  |  | 5 |  |  |  |  |  |
| G36 | 45 | 15 | 20 |  | 5 | 5 | 5 |  |  | 5 |  |  |  |
| G37 | 45 | 20 | 20 |  | 5 |  | 5 |  | 5 |  |  |  |  |
| G38 | 45 | 25 |  |  | 10 |  | 5 |  |  | 15 |  |  |  |
| G39 | 47 | 13 | 30 |  | 10 |  |  |  |  |  |  |  |  |
| G40 | 45 | 15 | 20 |  | 10 |  |  |  |  |  |  |  |  |
| G41 | 38 | 5.8 | 30 |  |  |  |  | 10 |  | 11.2 | 5 |  |  |
| G42 | 55 | 10 | 20 |  |  |  |  |  |  | 5 |  | 10 |  |
| G43 | 50 | 12 | 20 |  | 8 |  |  | 5 |  |  |  | 5 |  |
| G44 | 50 | 15 | 25 |  | 10 |  |  |  |  |  |  |  |  |
| G45 | 50 | 12 | 20 |  | 8 |  |  |  |  |  |  |  | 5 |
| G46 | 40 | 4 | 30 |  |  |  |  | 10 |  | 11 | 5 |  |  |
| G47 | 50 | 10 | 35 |  | 5 |  |  |  |  |  |  |  |  |
| G48 |  | 45 |  | 45 |  |  | 10 |  |  |  |  |  |  |
| G49 | 10 | 50 |  | 40 |  |  |  |  |  |  |  |  |  |
| G50 |  | 50 |  | 40 |  |  | 10 |  |  |  |  |  |  |
| G51 |  | 50 |  | 40 |  |  |  |  | 10 |  |  |  |  |
| G52 | 20 | 4.8 | 30 | 35 |  |  |  | 5 |  | 5.2 |  |  |  |
| G53 | 17 | 4.8 | 30 | 38 |  |  |  | 5 |  | 5.2 |  |  |  |
| G54 | 17 |  | 30 | 43 |  |  |  | 5 |  | 5 |  |  |  |
| G55 | 18 |  | 34 | 43 |  |  |  |  |  | 5 |  |  |  |

TABLE 2

Glass property

| Glass No. | Transition point (° C.) | Moisture resistance test | Laser absorption property | |
|---|---|---|---|---|
| G1 | 272 | X | ◎ | Comp. Example |
| G2 | 275 | X | ◎ | Comp. Example |
| G3 | 294 | X | ◎ | Comp. Example |
| G4 | 285 | X | ◎ | Comp. Example |
| G5 | 286 | X | ◎ | Comp. Example |
| G6 | 278 | X | ◎ | Comp. Example |
| G7 | 289 | X | ◎ | Comp. Example |
| G8 | 288 | X | ◎ | Comp. Example |
| G9 | 301 | X | ◎ | Comp. Example |
| G10 | 296 | X | ◎ | Comp. Example |
| G11 | 298 | X | ◎ | Comp. Example |
| G12 | 280 | ○ | ◎ | Example |
| G13 | 276 | X | ◎ | Comp. Example |
| G14 | 281 | ○ | ◎ | Example |
| G15 | 285 | ○ | ◎ | Example |
| G16 | 306 | X | ◎ | Comp. Example |
| G17 | 285 | ○ | ◎ | Example |
| G18 | 301 | X | ◎ | Comp. Example |
| G19 | 294 | X | ◎ | Comp. Example |
| G20 | 295 | ○ | ◎ | Example |
| G21 | 288 | ○ | ◎ | Example |
| G22 | 281 | ○ | ◎ | Example |
| G23 | 280 | ○ | ◎ | Example |
| G24 | 278 | ○ | ◎ | Example |
| G25 | 285 | ○ | ◎ | Example |
| G26 | 357 | X | ◎ | Comp. Example |
| G27 | 295 | ○ | ◎ | Example |
| G28 | 294 | ○ | ◎ | Example |
| G29 | 305 | ○ | ◎ | Example |
| G30 | 300 | ○ | ◎ | Example |
| G31 | 325 | X | ◎ | Comp. Example |
| G32 | 299 | X | ◎ | Comp. Example |
| G33 | 296 | ○ | ◎ | Example |
| G34 | 374 | X | ◎ | Comp. Example |
| G35 | 302 | ○ | ◎ | Example |
| G36 | 317 | ○ | ◎ | Example |
| G37 | 305 | ○ | ◎ | Example |
| G38 | 384 | X | ◎ | Comp. Example |
| G39 | 291 | ○ | ◎ | Example |
| G40 | 322 | ○ | ◎ | Example |
| G41 | 276 | ○ | ○ | Example |
| G42 | 313 | ○ | ◎ | Example |
| G43 | 312 | ○ | ◎ | Example |
| G44 | 293 | ○ | ◎ | Example |
| G45 | 307 | ○ | ◎ | Example |
| G46 | 269 | ○ | ◎ | Example |
| G47 | 279 | ○ | ◎ | Example |
| G48 | 241 | X | X | Comp. Example |
| G49 | 307 | X | ○ | Comp. Example |
| G50 | 270 | X | X | Comp. Example |
| G51 | 262 | X | X | Comp. Example |
| G52 | 204 | ○ | ○ | Example |
| G53 | 197 | ○ | ○ | Example |
| G54 | 177 | ○ | ○ | Example |
| G55 | 167 | ○ | ○ | Example |

The low melting glass compositions in Table 1 and Table 2 were prepared by the method to be described below. 150 to 200 g of each of starting materials formed by blending and mixing each of oxides as the starting materials was charged in a platinum crucible, heated to 900 to 950° C. at a temperature elevation rate of 5 to 10° C./min in an electric furnace, and kept for 1 to 2 hours. During keeping, they were stirred for forming homogeneous glass. The crucible was taken out of the electric furnace and cast on a stainless steel plate previously heated to about 150° C.

(Evaluation of Glass Transition Point)

Figure 3:
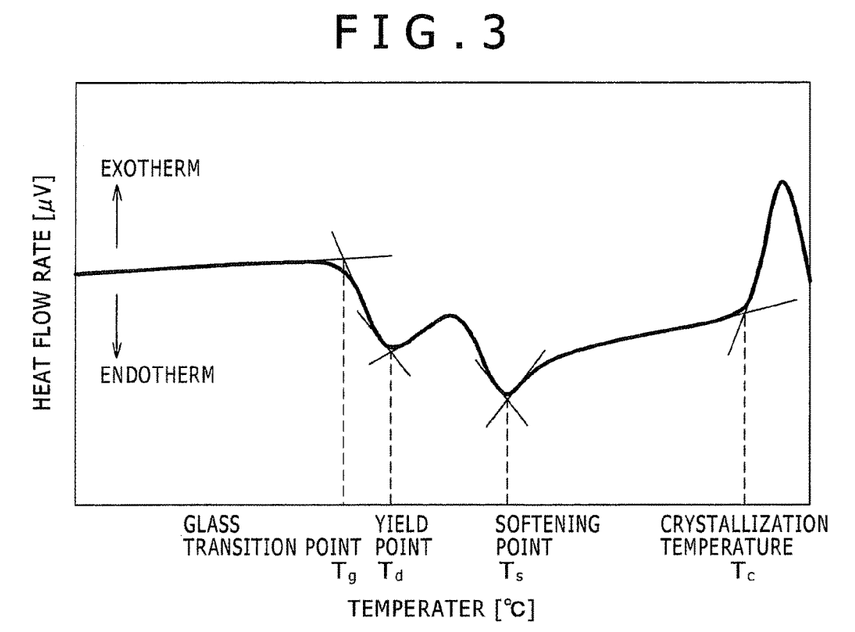
FIG. 3 illustrates an example of a DTA curve obtained by DTA measurement of a glass composition.

The glass cast on a stainless plate was pulverized to an average particle diameter (D50) of less than 20 μm and differential thermal analysis (DTA) was performed at a temperature elevation rate of 5° C./min thereby measuring the transition point (Tg). An alumina powder was used as a standard sample. FIG. 1 shows a typical DTA curve of glass. As shown in FIG. 3, Tg was defined as a starting temperature for the first endothermic peak.

(Evaluation Moisture Resistance of Glass)

A moisture resistance test was performed for 5 days under the condition at a temperature of 85° C. and at a humidity of 85%. Glasses each fabricated into a 4×4×20 mm cubic body were used as samples for the moisture resistance test. They were evaluated as "○" when there was no change in appearance and as "x" when change was observed. As can be seen from examples G12, 14 to 15, 17, 20 to 25, 27 to 30, 33, 35 to 37, 39 to 47, and 52 to 55 in Table 1 to Table 2, it can be seen that samples of good moisture resistance satisfy a relation of: $V_2O_5 > TeO_2 \geq P_2O_5$ (mass %) or a relation of: $Ag_2O > TeO_2 \geq P_2O_5$ (mass %) and have a glass transition point of 330° C. or lower and show good moisture resistance when the total of the oxides is 70 mass % or more and 95 mass % or less. Further, the evaluation was satisfactory when respective compositions satisfied 35 to 55 mass % of $V_2O_5$, 15 to 35 mass % of $TeO_2$, 4 to 20 mass % of $P_2O_5$, 5 to 15 mass % of $Fe_2O_3 + Sb_2O_3$ in total, and 5 to 30 mass % of one or more of $Fe_2O_3$, $BaO$, $K_2O$, $WO_3$, $MoO_3$, $MnO_2$, $Sb_2O_3$, and $Bi_2O_3$.

(Evaluation of Laser Absorption Property)

Figure 4:
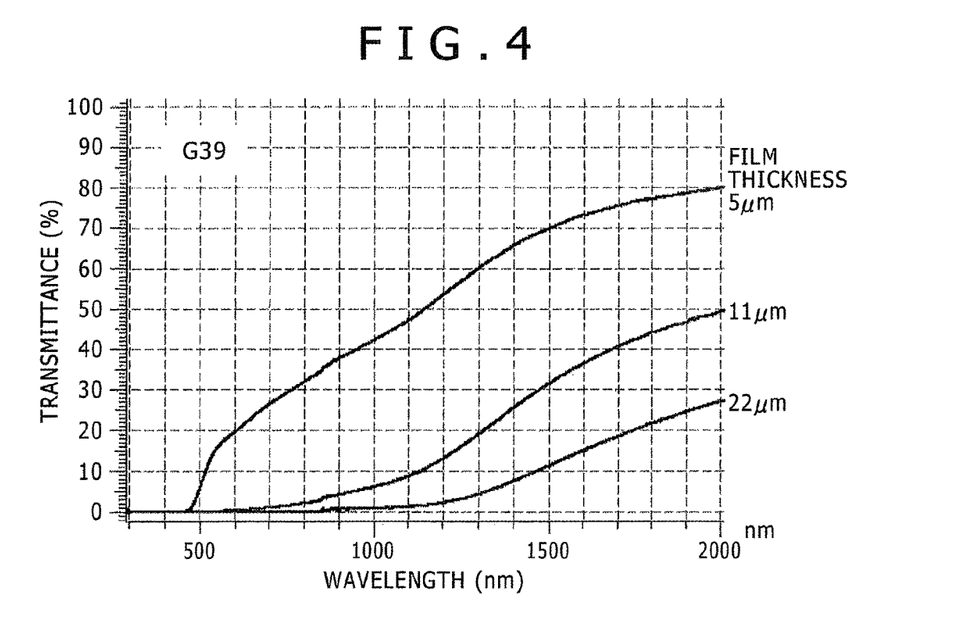
FIG. 4 illustrates a result of measurement for the transmittance of glass G39.
Figure 5:
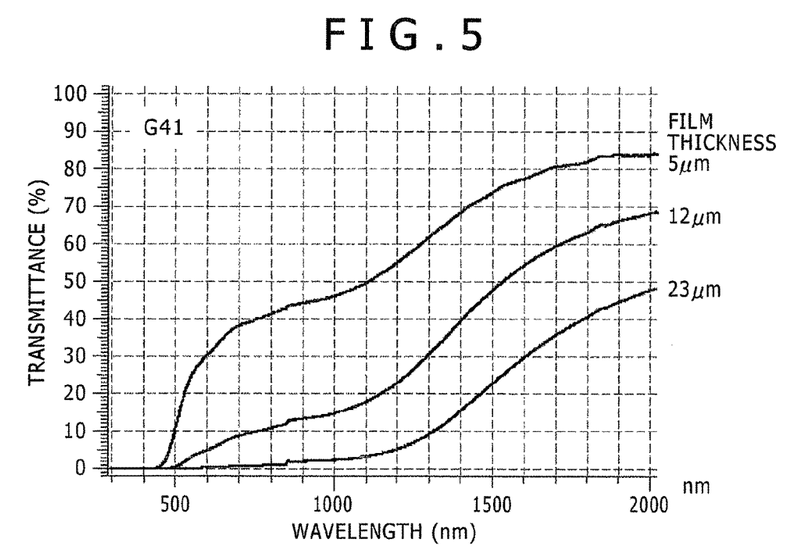
FIG. 5 illustrates a result of measurement for the transmittance of glass G41.
Figure 6:
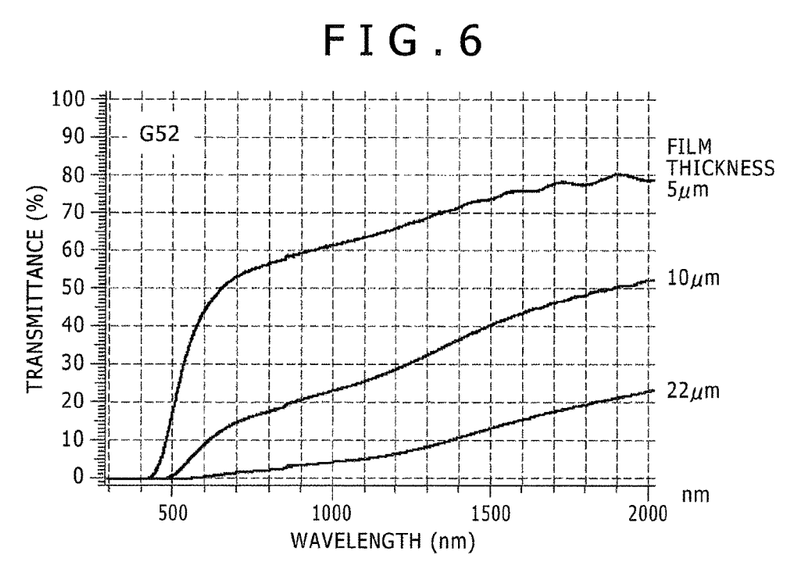
FIG. 6 illustrates a result of measurement for the transmittance of glass G52.

The glasses manufactured as described above were pulverized to about 3 μm average particle diameter (D50) by using a jet mill. 20% by weight of a butyl carbitol acetate solution containing 4% by weight of ethyl cellulose dissolved therein was added to 80% by weight of the powder to prepare pastes, which were coated by screen printing over a quartz glass substrate. Then, they were dried at 150° C. for 30 minutes and sintered at a temperature of transition points of each glass+100° C. for 30 minutes to prepare glass coating films. Transmittance of glass was evaluated for the manufactured glass coating films, by using a ultra-violet and visible spectrophotometer. In a case where the thickness of the glass coating film was about 5 μM, they were evaluated as "x" when the transmittance was 60% or more, as "○" when it was less than 60%, and as "⊚" when it was less than 40% at a wavelength of 808 nm. FIG. 4 to FIG. 6 illustrate absorption property of glasses G39, G41, and G52. As can be seen from the examples, it can be seen that the laser absorption property is good when vanadium is contained as the incorporated element. As can be seen from FIG. 4 to FIG. 6, it can be seen that the laser absorption property can be improved by increasing the thickness of the glass coating film. Accordingly, it is considered that the laser absorption property can be improved by adjusting the film thickness so long as the transition metal element having the absorption end in the region is contained.

(Manufacture of Composite Material)

70% by volume of a polystyrene resin as the thermoplastic resin was mixed to 30% by volume of a glass powder G39 having an average particle diameter (D50) of about 3 μm manufactured as described above, and injection molding was performed at 200° C. The manufactured composite material was irradiated with laser by using a semiconductor laser at a wavelength of 808 nm under the condition at a power of 20 W and at a scanning rate of 50 mm/s.

(Evaluation of Composite Material)

A tensile strength test was performed on the samples manufactured as described above according to JIS K 7162. A test was performed also for a sample not irradiated with the laser as a comparative material. As a result, it was found that the tensile strength was improved by 24% for the laser irradiated sample compared with the sample with no laser irradiation. It is considered that the glass powder was selectively heated by the laser and melted in the resin, so that bonds such as V–O–C, V–C, etc. were formed between the glass and the resin and the tensile strength was improved.

Since it is considered that the bonds described above were formed by melting the glass in the resin, it is considered that the same result can also be obtained by using another method of selectively heating only the glass. Since the glass under investigation is a semiconductor and well absorbs microwaves at a wavelength of 0.1 mm to 1,000 mm to generate heat, microwaves can also be used as the glass heating means. Actually, when a heating experiment was performed for the glass (4×4×1 cm) shown in the example by using a microwave irradiation apparatus manufactured by Shikoku Instrumentation Co., Ltd., a state that the glass was red-heated and melted in about 3 minutes could be observed.

Further, since bonds are formed between the organic ingredient of the resin and the oxide glass in the invention, the material composited with the oxide glass is not restricted to the resin but the invention is applicable also to the rubber.

Example 2

70% by volume of an epoxy resin as a thermosetting resin was mixed to 30% by volume of a glass powder G55 having an average particle diameter (D50) of about 3 μm. A hardening agent was further added and then they were vacuum-defoamed and hardened for 20 hours. The manufactured composite material was irradiated with laser in the same manner as in Example 1 by using a semiconductor laser at a wavelength of 808 nm under the conditions at a power of 20 W and at a scanning speed of 50 mm/s. Then, when a tensile strength test was performed in the same manner, it was found that the tensile strength was improved by 15% compared with a sample without laser irradiation.

Example 3

In the same manner as in Example 1, 40% by volume of a polystyrene resin was mixed to 60% by volume of a glass powder G55 having an average particle diameter (D50) of about 3 μm and they were injection molded at 230° C. Laser irradiation was performed to the manufactured composite material by using a semiconductor laser at a wavelength of 808 nm under the conditions at a power of 20 W and at a scanning speed of 50 mm/s. FIG. 6 illustrates a schematic cross sectional view of the manufactured sample.

A bending strength test was performed on the sample manufactured as described above according to JIS R 1601. A test was performed also on a sample without irradiation of laser as a comparative material. As a result, it was found that the tensile strength was improved by 6% in the sample with laser irradiation compared with the sample with no laser irradiation. In view of the result described above, improvement in mechanical properties due to the laser irradiation was confirmed also in a case where the glass was used as the matrix material.

Example 4

An acceleration test at high temperature and high humidity was performed for the composite material manufactured in Example 1 under the condition at a temperature of 85° C. and at a humidity of 85%. Laser irradiation was applied to the composite material after the acceleration test at high temperature and high humidity by using a semiconductor laser at a wavelength of 808 nm under the condition at a power of 20 W and at a scanning speed of 50 mm/s in the same manner as in Example 1. Then, when a tensile strength test was performed in the same manner, it was found that the tensile strength was improved by 30% compared with the sample with no laser irradiation. Accordingly, it was found that the performance of the resin was regenerated by applying the laser irradiation again.

Example 5

Figure 7:
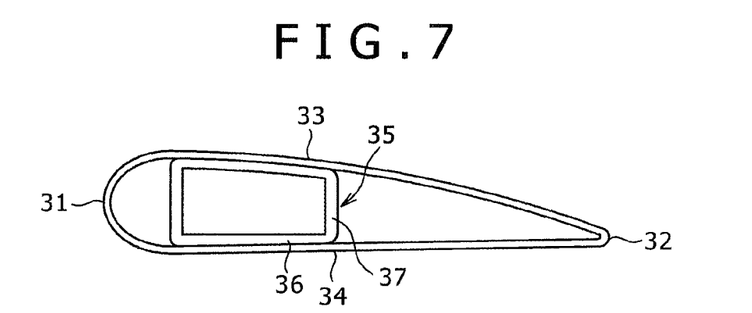
FIG. 7 is a transversal cross sectional view of a wind turbine blade structure made of a fiber reinforced resin in a direction perpendicular to a longitudinal axis of a blade.

FIG. 7 is a cross sectional view of a wind turbine blade structure made of a fiber reinforced resin in a direction perpendicular to a longitudinal axis of a blade.

A blade comprises an outer plate referred to as an upper skin 33 and a lower skin 34 that connect a front edge 31 and a rear edge 32 in which a box-shaped beam member referred to as a spar 35 having a layered structure is provided between the upper skin 33 and the lower skin 34 over the longitudinal direction of the blade. Further, the spar 35 comprises flanges 36 in contact with the inner circumferential surface of the upper skin 33 and the lower skin 34, and a web 37 that connects upper and lower flanges of the blade. The spar 35 may be in a C-shape, I-shape, or plate-shape in addition to the box-like shape described above. The upper skin 33 and the lower skin 34 are preferably made of a fiber reinforced resin (FRP) due to the reason of reducing the weight and providing corrosion resistance. A glass fiber reinforced resin (GFRP) in which glass fibers were impregnated with a matrix resin is used in the invention. The glass fibers are fibrous glass mainly comprising silicon dioxide ($SiO_2$) and having a fiber diameter of about 5 to 20 μm.

Figure 8:
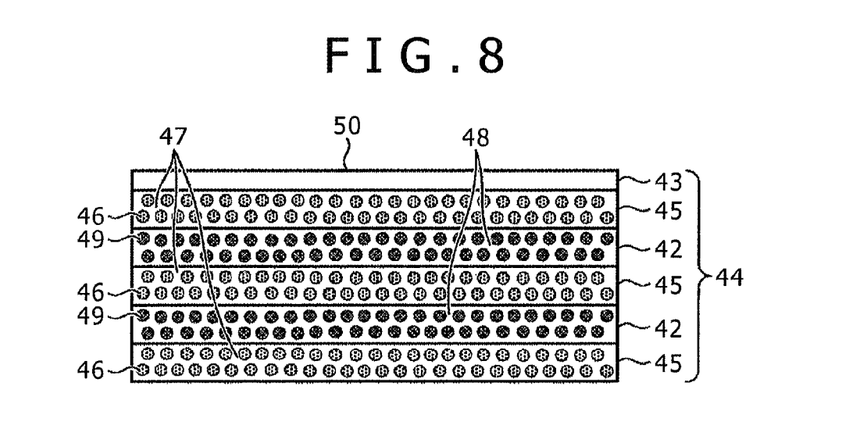
FIG. 8 is a schematic view of a fragmentary cross sectional view for an upper portion of a flange in FIG. 7.

FIG. 8 is a fragmentary cross sectional view of an upper flange 36 (flange 50). A composite layer 44 was integrally formed by carbon fiber layers 42 and glass fiber layers 45 laminated alternately, and an adhesive layer 43. The adhesive layer 43 was bonded with the upper skin (not illustrated). In glass fibers layer 45, the glass fiber 26 was impregnated with a matrix resin 47. In the carbon fiber layer 42, carbon fibers 49 were impregnated with a resin.

The resin forming the carbon fiber layer 42 and the glass fiber layer 45 includes a thermosetting resin, for example, an epoxy resin, a vinyl ester resin, and an unsaturated polyester resin. The composite material of this example is used for the matrix resin 47 of the upper skin 33, the lower skin 34, and the glass fiber layer 45. Since the glass fiber 46 comprises $SiO_2$ as a main ingredient, it is not softened at a temperature where the glass in the matrix resin 47 is softened and keeps a function as a reinforcing material. The glass in the matrix resin 47 is in partial contact with the glass fibers 46. When the glass in the matrix resin 47 is softened and bonded to the glass fibers 46, the glass in the matrix resin 47 and the glass fibers 46 are bonded closely and the bonding strength at the boundary between the glass fibers 46 and the matrix resin 47 is improved greatly compared with the case of using a usual resin matrix. Further, when the composite material of this example is used also to the matrix resin of the carbon fiber layer 42, since both of the glass in the matrix resin 47 and the glass in the matrix resin 48 are softened and bonded, the glass fiber layer 45 and the carbon fiber layer 42 can also be bonded closely.

When a 3-point bending fatigue test was performed (Measuring method: According to JIS K 7118 and K 7082) by a 70% distortion amount of the static strength of the spar 35, lowering of the bending rigidity was not observed even after $10^6$ times of cycles. In a case where the matrices of the upper skin 33, the lower skin 34, and the glass fiber layer 42 are a usual resin, cracks were observed in the layer 42 of the lower flange at $10^5$ times of cycles and the bending rigidity was lowered to 90% after $10^6$ times of cycles.

Further, since the glass of this example is a semiconductor and the upper skin 33 and the lower skin 34 have an electric conductivity to some extent, damages due to current passage caused by thunderbolt struck, etc. are reduced, which is advantageous in view of safety.

As the method of manufacturing the blade structure made of FRP of the invention, any of known molding techniques, for example, a prepreg method, a resin transfer molding (RTM) method, a drawing method, a filament winding method, a hand layup method, etc. can be used.

Further, a glass powder, a resin binder, and a solvent were mixed to prepare a slurry used for spraying. Nitrocellulose was used as the resin binder and butyl carbitol acetate was used as the solvent. The slurry was coated by spraying on the surface of a blade and heated and kept at a glass transition point or higher thereby capable of forming a protection film. This can improve the weather resistance of the blade and can provide electric conductivity.

LIST OF REFERENCE SIGNS

11, 22 resin, etc.
12, 21 oxide glass
31 front edge
32 rear edge
33 upper skin
34 lower skin
35 spar
36, 50 flange
37 web
42 carbon fiber layer
43 adhesive layer
44 composite layer
45 glass fiber layer
46 glass fiber
47, 48 matrix resin
49 carbon fiber

The invention claimed is:

1. A composite material comprising:
   a resin or a rubber;
   and a glass oxide dispersed in the resin or the rubber, wherein the composite material is irradiated with electromagnetic waves, causing selective softening and fluidizing of the oxide glass within the composite material to chemically bond the glass oxide with the resin or the rubber,
   wherein the glass oxide comprises an element capable of absorbing the electromagnetic waves and has a wavelength transmittance that is at least 20% smaller than a wavelength transmittance of the resin or rubber,
   wherein the glass oxide is not pretreated prior to being dispersed in the resin or the rubber, and
   wherein a heat decomposition temperature of the resin or the rubber is at least +100° C. more than a transition point of the glass oxide.

2. The composite material according to claim 1, wherein the electromagnetic waves are a laser at a wavelength of 400 to 3000 nm.

3. The composite material according to claim 1, wherein the electromagnetic waves are microwaves at a wavelength of 0.1 to 1000 mm.

4. The composite material according to claim 1, wherein the oxide glass contains a transition metal element and has a transition point of 330° C. or lower.

5. The composite material according to claim 4, wherein the transition metal element includes V.

6. The composite material according to claim 4, wherein the oxide glass satisfies $V_2O_5 > TeO_2 \geq P_2O_5$ (mass %); or $Ag_2O > TeO_2 \geq P_2O_5$ (mass %) in a state of oxides and, further, a total in the state of the oxides is 70 mass % or more and 95 mass % or less.

7. The composite material according to claim 4, wherein the oxide glass contains one or more of elements of Fe, Ba, K, W, Mo, Mn, Sb, and Bi.

8. The composite material according to claim 4, wherein the oxide glass comprises 35 to 55 mass % of $V_2O_5$, 15 to 35 mass % of $TeO_2$, 4 to 20 mass % of $P_2O_5$, 5 to 15 mass % of $Fe_2O_3 + Sb_2O_3$ in total, and 5 to 30 mass % of one or more of $Fe_2O_3$, $BaO$, $K_2O$, $WO_3$, $MoO_3$, $MnO_2$, $Sb_2O_3$, and $Bi_2O_3$ in terms of oxides conversion.

9. A coating material containing the composite material according to claim 1 and an organic solvent.

10. A glass fiber reinforced resin in which the composite material according to claim 1 and glass fibers are composited.

11. An electro conductive package comprising the composite material according to claim 1.

12. A blade for wind power generation having the glass fiber reinforced resin according to claim 10.

13. The composite material according to claim 1, wherein the composite material comprises glass oxide in an amount between 30%-60% by volume of the composite material and the resin or rubber in an amount between 40%-70% by volume of the composite material.

\* \* \* \* \*